(12) United States Patent
    Maeda

(10) Patent No.: US 10,899,180 B2
(45) Date of Patent: Jan. 26, 2021

(54) MOTORCYCLE TIRE FOR RUNNING ON ROUGH TERRAIN

(71) Applicant: SUMITOMO RUBBER INDUSTRIES, LTD., Kobe (JP)

(72) Inventor: Yohei Maeda, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 282 days.

(21) Appl. No.: 15/819,248

(22) Filed: Nov. 21, 2017

(65) Prior Publication Data

US 2018/0141388 A1    May 24, 2018

(30) Foreign Application Priority Data

Nov. 22, 2016 (JP) .................................. 2016-227071

(51) Int. Cl.
    *B60C 11/11*    (2006.01)
(52) U.S. Cl.
    CPC ........... *B60C 11/11* (2013.01); *B60C 2200/10* (2013.01); *B60C 2200/14* (2013.01)
(58) Field of Classification Search
    CPC . B60C 11/11; B60C 2200/14; B60C 2200/10; B60C 11/0306; B60C 11/0311; B60C 11/0302; B60C 11/0309; B60C 11/00
    See application file for complete search history.

(56) References Cited

U.S. PATENT DOCUMENTS

| 2012/0018067 A1* | 1/2012 | Hikita | B60C 11/11 152/209.8 |
| 2013/0014868 A1* | 1/2013 | Ishida | B60C 11/11 152/209.11 |
| 2016/0214439 A1* | 7/2016 | Ogo | B60C 11/11 |

FOREIGN PATENT DOCUMENTS

| EP | 2 546 079 A1 | 1/2013 |
| EP | 3 047 982 A1 | 7/2016 |
| JP | 58-170603 A | 10/1983 |
| JP | 2004-306843 A | 11/2004 |

OTHER PUBLICATIONS

Extended European Search Report dated Apr. 17, 2018, in European Patent Application No. 17201419.3.

* cited by examiner

*Primary Examiner* — Jacob T Minskey
*Assistant Examiner* — Adrien J Bernard
(74) *Attorney, Agent, or Firm* — Birch, Stewart, Kolasch & Birch, LLP

(57) ABSTRACT

A motorcycle tire is provided in a tread portion 2 with blocks including crown blocks 11 disposed in a tread crown region 3. The crown blocks 11 include first crown blocks 16 on the tire equator C, pairs of second crown blocks 17, and pairs of third crown blocks 18. The minimum axial distance L2 between the ground contacting top surfaces of the paired second crown blocks 17 is smaller than the maximum axial width L1 of the ground contacting top surface of the first crown block 16. The minimum axial distance L3 between the ground contacting top surfaces of the paired third crown blocks 18 is greater than the maximum axial width L1 of the first crown block 16.

20 Claims, 7 Drawing Sheets

MOTORCYCLE TIRE FOR RUNNING ON ROUGH TERRAIN

TECHNICAL FIELD

The present invention relates to a motorcycle tire suitable for running on rough terrain, more particularly to tread block arrangement capable of improving the traction performance of the tire.

BACKGROUND ART

Motorcycle tires suitable for running on rough terrain for example used in motocross race or the like are usually provided with crown blocks disposed in a crown region of the tread portion to provide a large tractional force and braking force when running on rough terrain (in general, traction performance).

Various designs of crown blocks have been proposed in order to improve the traction performance. For example, the following Patent Document 1 discloses a motorcycle tire for running on rough terrain, wherein a tread crown region is provided with first crown blocks disposed on the tire equator, and plural pairs of second crown blocks disposed one on each side of the tire equator adjacently to each other.
The minimum axial distance between the ground contacting top surfaces of the paired second crown blocks is smaller than the maximum axial width of the first crown block.
The plural pairs of the second crown blocks are arranged in succession in the tire circumferential direction.
In such block arrangement, mud is liable to be clogged between the second crown blocks adjacent in the tire circumferential direction, which tends to reduced the traction performance on muddy ground.
Patent Document 1: Japanese Unexamined Patent Publication No. 2004-306843

SUMMARY OF THE INVENTION

The present invention was made in view of the circumstances described above, and it is an object of the present invention to provide a motorcycle tire suitable for running on rough terrain, which can exhibit excellent traction performance by improving the arrangement of crown blocks.

According to the present invention, a motorcycle tire for running on rough terrain comprises:
a tread portion provided with crown blocks each having a ground contacting top surface whose centroid is positioned in a crown region which is defined as being centered on the tire equator and having a developed axial width of ⅓ of the developed tread width of the tread portion, wherein
the crown blocks include
first crown blocks disposed on the tire equator,
plural pairs of second crown blocks disposed one on each side of the tire equator at different circumferential positions from circumferential positions of the first crown blocks, and
plural pairs of third crown blocks disposed one on each side of the tire equator at different circumferential positions from the circumferential positions of the first crown blocks and the second crown blocks,
in each pair of the second crown blocks, the minimum axial distance L2 between the ground contacting top surfaces thereof is smaller than the maximum axial width L1 of each first crown block, and
in each pair of the third crown blocks, the minimum axial distance L3 between the ground contacting top surfaces thereof is larger than the maximum axial width L1 of each first crown block.

Further, the motorcycle tire according to the present invention may have the following features:
(1) the above-said maximum axial width L1 is in a range from 9% to 13% of the developed tread width;
(2) the above-said minimum axial distance L2 is in a range from 0.60 to 0.80 times the above-said maximum axial width L1;
(3) the above-said minimum axial distance L3 is in a range from 1.50 to 1.70 times the above-said maximum axial width L1;
(4) the first crown blocks, the pairs of the second crown blocks and the pairs of the third crown blocks are arranged around the circumference of the tire without overlapping with each other in the tire circumferential direction;
(5) the first crown blocks, the plural pairs of the second crown blocks and the plural pairs of the third crown blocks can be arranged circumferentially of the tire such that each of the first crown blocks is disposed between one of the plural pairs of the second crown blocks and one of the plural pairs of the third crown blocks;
(6) the first crown blocks, the plural pairs of the second crown blocks and the plural pairs of the third crown blocks can be arranged circumferentially of the tire such that each of the plural pairs of the second crown blocks is disposed between one of the first crown blocks and one of the plural pairs of the third crown blocks;
(7) the first crown blocks, the plural pairs of the second crown blocks and the plural pairs of the third crown blocks can be arranged circumferentially of the tire such that each of the plural pairs of the third crown blocks is disposed between one of the plural pairs of the second crown blocks and one of the first crown blocks;
(8) the first crown blocks, the plural pairs of the second crown blocks and the plural pairs of the third crown blocks can be arranged circumferentially of the tire such that a minimum circumferential distance L4 from the ground contacting top surface of each of the first crown block to the ground contacting top surfaces of the circumferentially adjacent one of the plural pairs of the second crown blocks is larger than a minimum circumferential distance L5 from the ground contacting top surface of said each first crown block to the ground contacting top surfaces of the circumferentially adjacent one of the plural pairs of the third crown blocks.

DESCRIPTION OF THE PREFERRED EMBODIMENTS

Embodiments of the present invention will now be described in detail in conjunction with accompanying drawings.

In the following embodiments, motorcycle tires for running on rough terrain according to the present invention are designed for motocross races. But, the present invention is obviously not limited to such usage.

In the following embodiments, the motorcycle tires 1 according to the present invention are pneumatic tires.

As well known in the art, a pneumatic tire comprises a tread portion whose radially outer surface defines the tread, a pair of axially spaced bead portions mounted on rim seats, and a pair of sidewall portions extending between the tread edges and the bead portions.

The motorcycle tire 1 according to the present invention comprises a tread portion 2 provided with blocks (generically 10) rising from the tread base surface (or the bottom of the sea area of the tread).

As a characteristic of a motorcycle tire, the tread portion 2 (inclusive of a carcass, tread reinforcement and tread rubber which are not shown) is convexly curved in the tire cross section including the tire rotational axis, so that the tread base surface is curved like an arc swelling radially outwardly, and the maximum cross sectional width of the tire 1 occurs between the tread edges Te.

Figure 1:
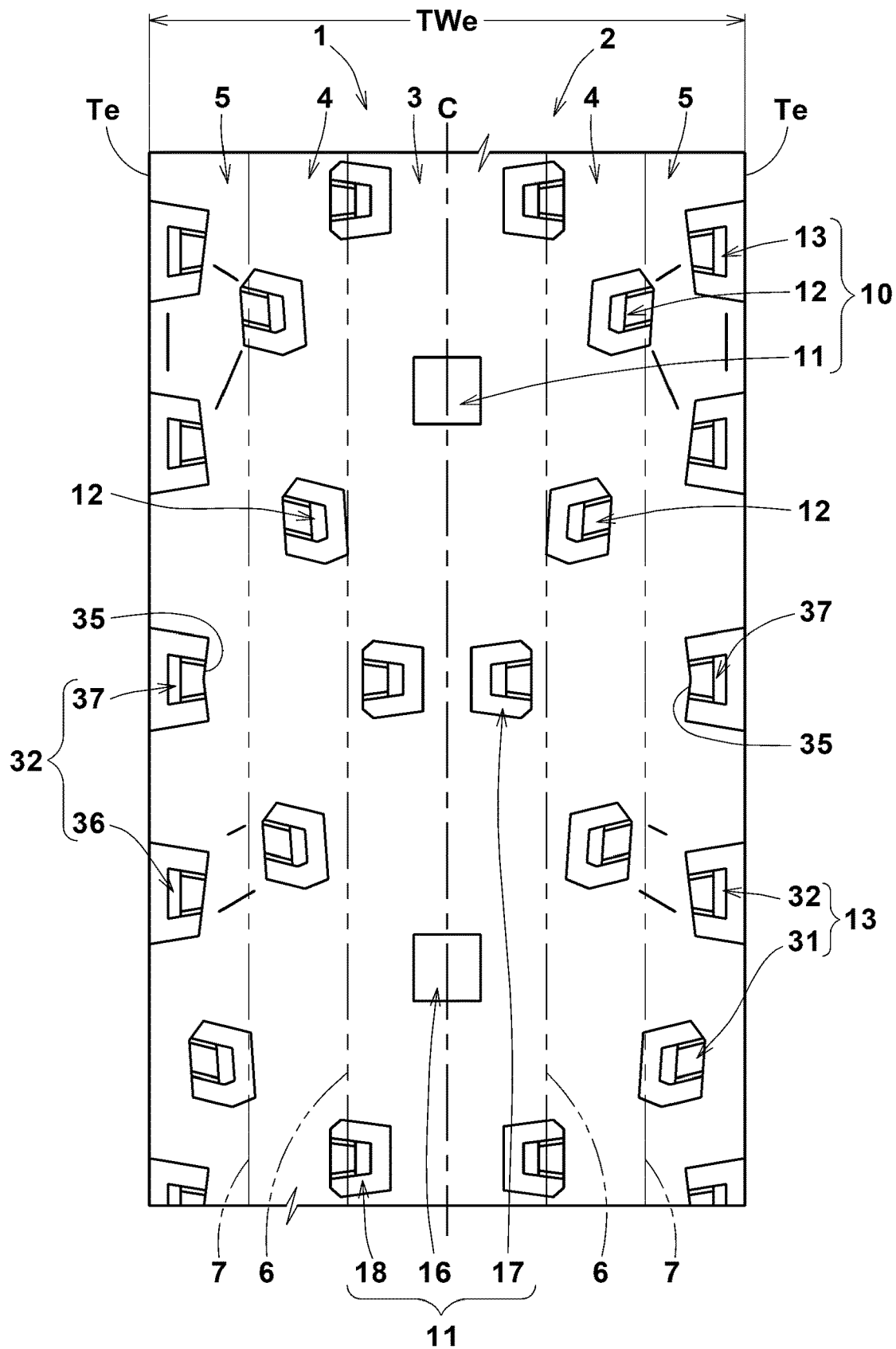
FIG. 1 is a developed partial view of a tread portion of a motorcycle tire as an embodiment of the present invention.

FIG. 1 shows a circumferential portion of the tread portion 2 of the first embodiment developed in a plane, wherein only the ground contacting top surfaces of the blocks 10 are shown. The same applied to FIGS. 5, 6 and 7.

As shown in FIG. 1, the developed tread portion 2 is zoned into a central crown region 3, a pair of axially outermost shoulder regions 5, and a pair of middle regions 4. Each region 3, 4 and 5 is provided with the blocks 10.

The crown region 3 is centered on the tire equator C, and has a developed width of ⅓ of the developed tread width Twe which is the axial width of the developed tread portion 2 between the tread edges Te. The tread edges Te are defined by axially outermost edges of the axially outermost blocks 10.

The shoulder regions 5 extend from the respective tread edges Te toward the tire equator C and each have a developed width of ⅙ of the developed tread width Twe.

The middle regions 4 extend between the respective shoulder regions 5 and the crown region 3 and each have a developed width of ⅙ of the developed tread width Twe.

In the drawings, reference numerals 6 and 7 denote border lines between the middle regions 4 and the crown region 3, and border lines between the middle regions 4 and the shoulder regions 5.

Figure 2:
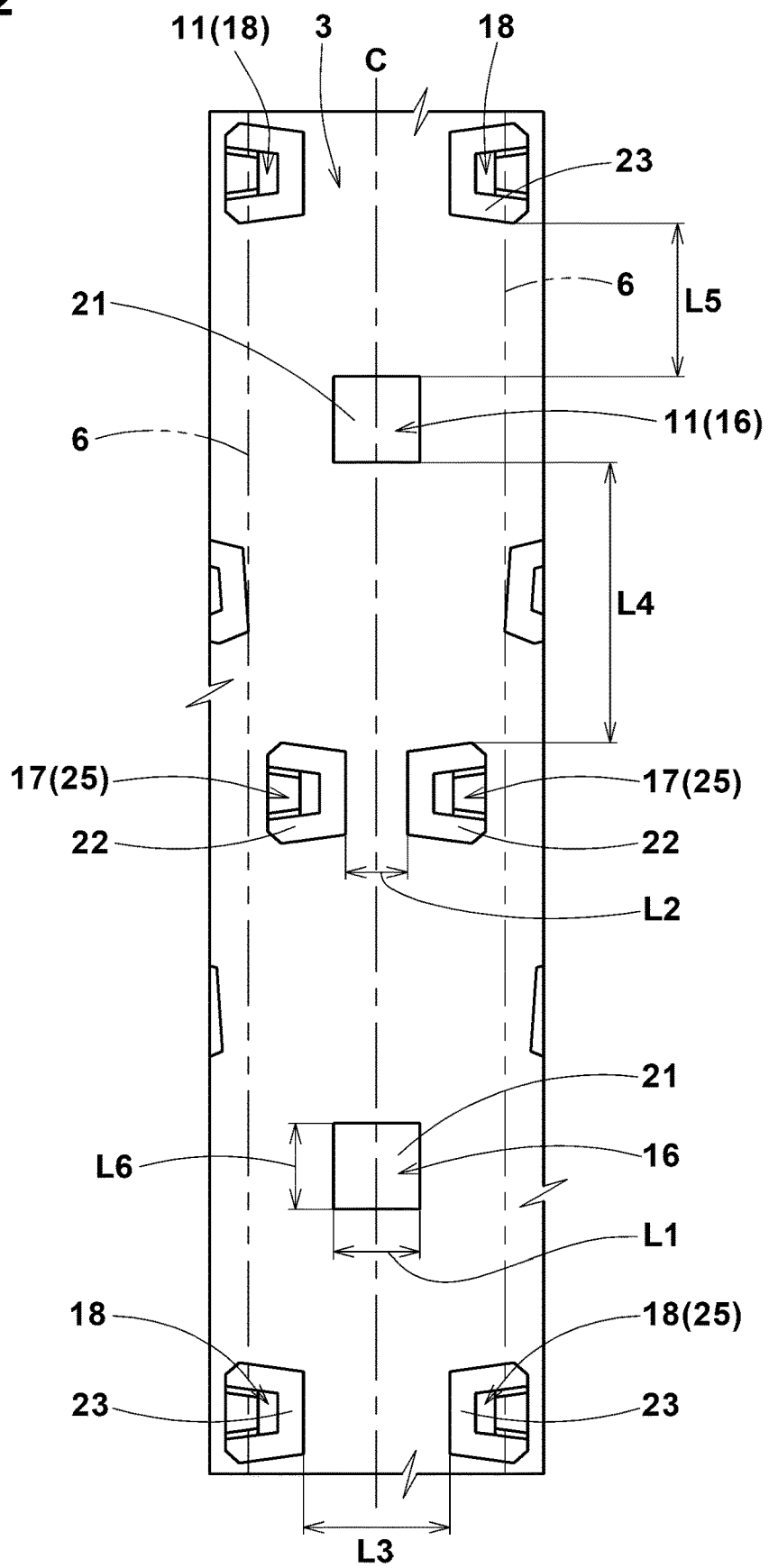
FIG. 2 is an enlarged partial view of the crown region of the tread portion.

As shown in FIG. 2 which shows the crown region 3 of the first embodiment, crown blocks 11 are provided. The crown block 11 is defined as having its ground contacting top surface whose centroid is located within the crown area 3.

The crown blocks 11 include first crown blocks 16, plural pairs of second crown blocks 17, and plural pairs of third crown blocks 18, which are disposed at different positions in the tire circumferential direction.

The crown blocks 11 are to provide a large traction during running on rough terrain by digging into the ground.

The first crown blocks 16 are each disposed on the tire equator C. In this example, the tire equator C intersects the axial center of the ground contacting top surface of the first crown block 16. According to the present invention, however, the position intersected by the tire equator C may be off centered, for example, at a position on the base portion of the first crown block 16 which increases its axial dimension toward the base of the first crown block 16.

The first crown block 16 can dig deeper into the ground during running on rough terrain, by utilizing its high ground pressure, in order to provide a large traction.

The first crown block 16 in this example is a plain block whose ground contacting top surface is provided with neither groove nor sipe. such first crown block 16 is rather hard to deform even when contacting with hard ground, and it is possible to provide a large frictional force.

In this example, the ground contacting top surface 21 of the first crown block 16 is a quadrangular, preferably, a square or a rectangle.

In order to facilitate the digging into the ground while maintaining the block durability, the maximum axial width L1 of the ground contacting top surface 21 is preferably set in a range from 9 to 13% of the developed tread width Twe. The maximum circumferential width L6 of the ground contacting top surface 21 is preferably set in a range from 0.90 to 1.10 times the maximum axial width L1.

In each pair of the second crown blocks 17, the two blocks 17 are disposed one on each side of the tire equator C adjacently to each other at the same circumferential position. In this example, the two blocks 17 are arranged line-symmetrically about the tire equator C.

In each pair of the second crown blocks 17, the minimum axial distance L2 between their ground contacting top surfaces 22 is smaller than the maximum axial width L1 of the ground contacting top surface 21 of the first crown block 16. When running on hard rough terrain such as compacted soil, such paired second crown blocks 17 can dig into the ground together like a one body, reducing the distance between the blocks, therefore, the paired second crown blocks 17 can provide a large traction on hard rough terrain.

In order to effectively derive such advantageous effects, the minimum axial distance L2 is preferably not less than 0.60 times, more preferably not less than 0.65 times, but preferably not more than 0.80 times, more preferably not more than 0.75 times the maximum axial width L1.

In each pair of the third crown blocks 18, the two blocks 18 are disposed one on each side of the tire equator C adjacently to each other at the same circumferential position. In this example, the blocks 18 are arranged line-symmetrically about the tire equator C.

The minimum axial distance L3 between the ground contacting top surfaces of the blocks 18 is greater than the maximum axial width L1 of the first crown block 16.

when running on soft rough terrain such as muddy terrain, mud, soil and the like are hard to clog between the paired third crown blocks 18 owing to the larger minimum axial distance L3 therebetween. Therefore, the paired third crown blocks 18 can continuously provide a large traction during running on soft rough terrain.

In order to effectively derive such advantageous effects, the minimum axial distance L3 is preferably not less than 1.50 times, more preferably not less than 1.55 times, but preferably not more than 1.70 times, more preferably not more than 1.65 times the maximum axial width L1.

The first crown blocks 16, the plural pairs of the second crown blocks 17 and the plural pairs of the third crown blocks 18 are arranged around the circumference of the tire in a sequence.

In the first embodiment shown in FIG. 1, the sequence is such that each of the first crown blocks 16 is disposed between one of the plural pairs of the second crown blocks 17 and one of the plural pairs of the third crown blocks 18. Thus, the first crown blocks 16 are not arranged in succession in the tire circumferential direction, and it becomes possible to reduce the stress acting on the base portion of each of the first crown blocks 16 when running on rough terrain, therefore, the durability of the first crown block 16 is increased.

Figure 5:
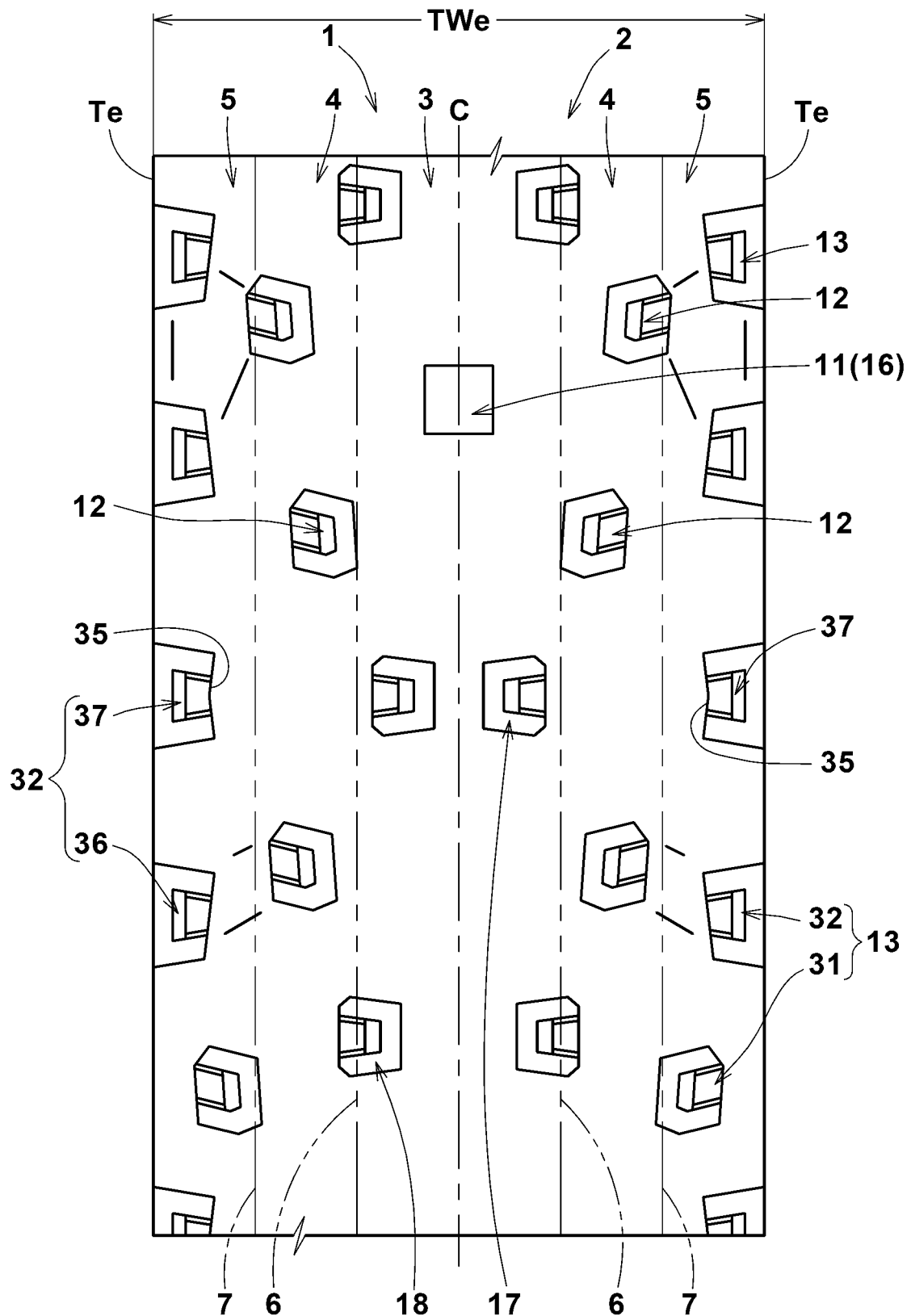
FIG. 5 is a developed partial view of a tread portion of a motorcycle tire as another embodiment of the present invention.

Further, as shown in FIG. 5 which shows the second embodiment, the sequence can be such that each of the plural pairs of the second crown blocks 17 is disposed between one of the first crown blocks 16 and one of the plural pairs of the third crown blocks 18.

Figure 6:
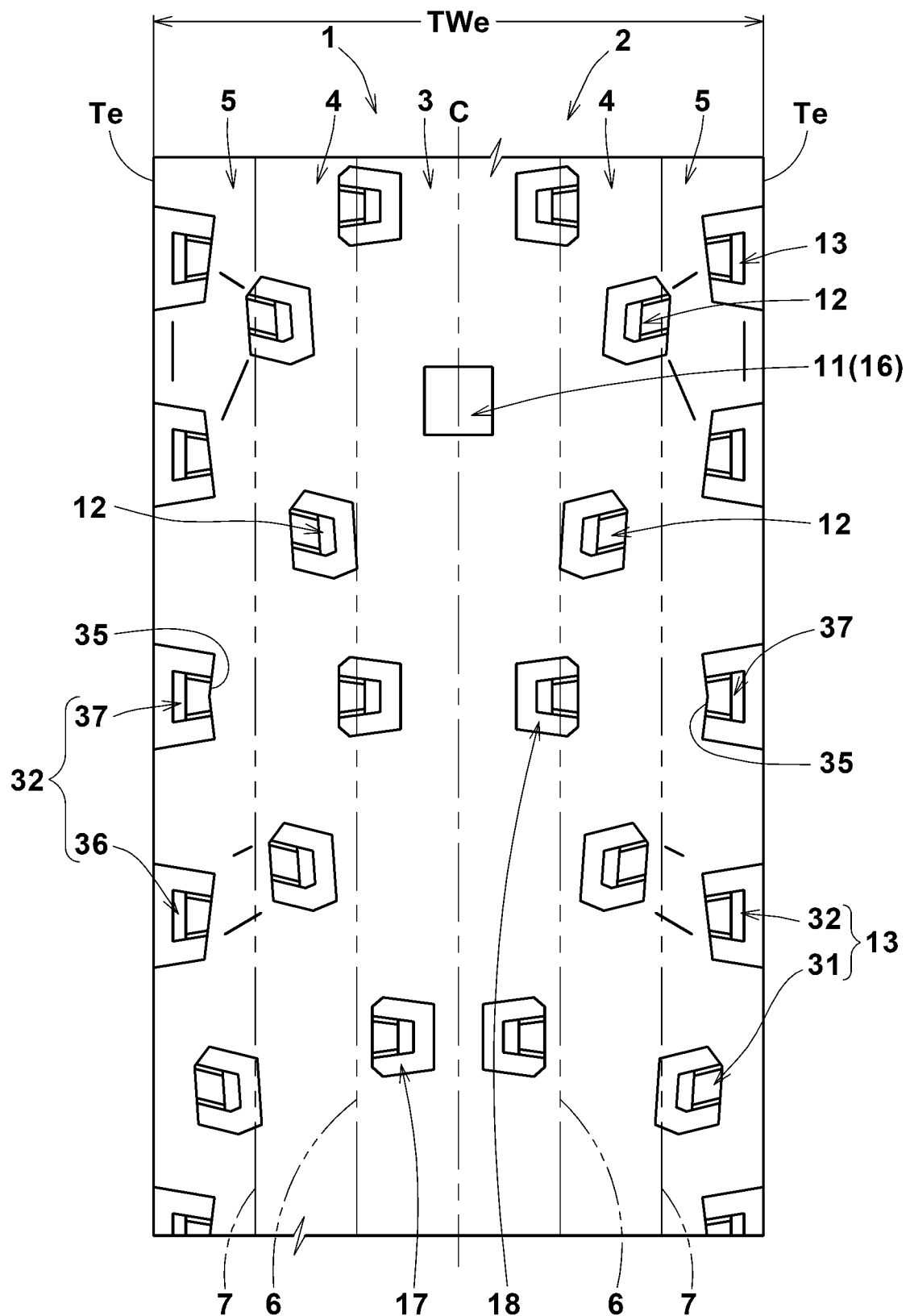
FIG. 6 is a developed partial view of a tread portion of a motorcycle tire as still another embodiment of the present invention.

Furthermore, as shown in FIG. 6 which shows the third embodiment, the sequence can be such that each of the plural pairs of the third crown blocks 18 is disposed between one of the first crown blocks 16 and one of the plural pairs of the second crown blocks 17.

In the second and third embodiments, as the paired second crown blocks 17 are circumferentially adjacent to the paired third crown blocks 18, it is possible to obtain a large traction when running on soft rough terrain.

In the first embodiment shown in FIGS. 1 and 2, it is preferable that the minimum circumferential distance L4 from the ground contacting top surface 21 of the first crown block 16 to the ground contacting top surfaces 22 of the paired second crown blocks 17 is greater than the minimum circumferential distance L5 from the ground contacting top surface 21 of the same first crown block 16 to the ground contacting top surfaces 23 of the paired third crown blocks 18. Preferably, the minimum circumferential distance L4 is set in a range from 1.75 to 2.0 times the minimum circumferential distance L5.

Thereby, it is possible to prevent the space between the first crown block 16 and the paired second crown blocks 17 from being clogged with mud and soil when running on soft rough terrain.

Preferably, the minimum circumferential distance L4 and the minimum circumferential distance L5 are set in a range from 2.5 to 4.5 times the maximum circumferential width L6 of the ground contacting top surface of the first crown block 16. If the minimum circumferential distance L4 and the minimum circumferential distance L5 are less than 2.5 times the maximum circumferential width L6, there is a possibility that the above-said space is clogged with mud and soil during running on soft rough terrain.

If the minimum circumferential distance L4 and the minimum circumferential distance L5 are greater than 4.5 times the maximum circumferential width L6, there is a possibility that the number of the crown blocks 11 is decreased, and the traction performance on hard rough terrain deteriorates.

In each embodiment, between the second crown blocks 17 in each pair and between the third crown blocks 18 in each pair, there are no tie bars rising from the tread base surface to connect between the blocks. In other words, the paired blocks are completely separated from each other.

Thus, the distance between the blocks becomes liable to vary by the applied ground pressure, and as a results, mud and soil are easily discharged. From this viewpoint, if the tie bar is provided between the blocks, it is preferable that the height of the tie bar is at most 0.3 times the height of the blocks, each from the tread base surface.

In each embodiment, it is preferred that the second crown blocks 17 and the third crown blocks 18 are each formed as a grooved block 25 provided in the ground contacting top surface with a groove.

Figure 3A:
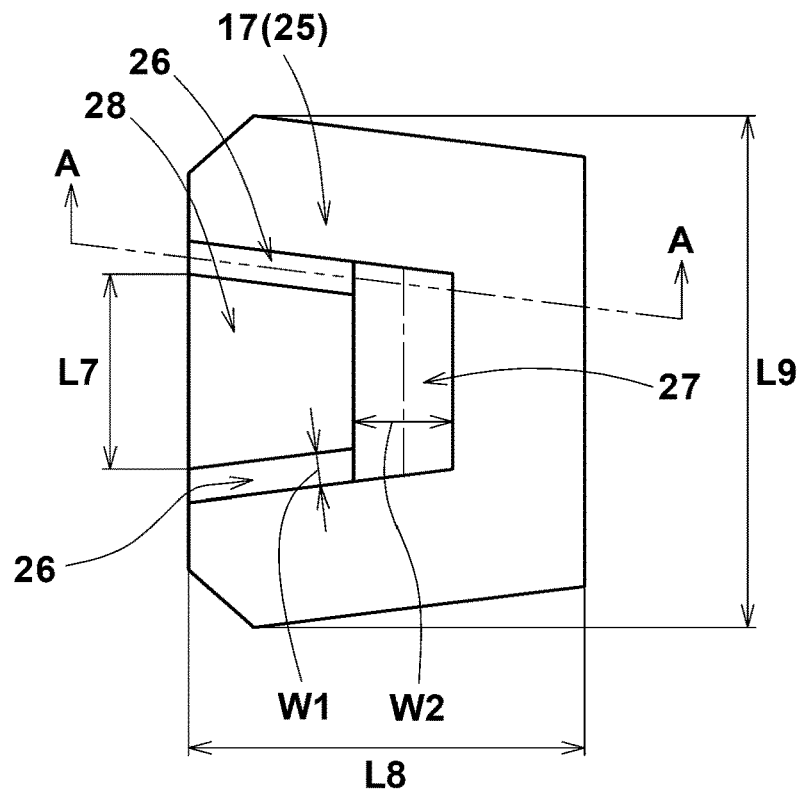
FIG. 3(a) is an enlarged top view of a grooved block shown in FIG. 2.

FIG. 3(a) shows an example of such grooved block 25 as the second crown block 17.

As shown, the groove of the grooved block 25 comprises a pair of first groove portions 26 extending in the tire axial direction, and a second groove portion 27 connecting therebetween.

The first groove portions 26 and the second groove portion 27 increase the edges of the ground contacting top surface of the block to increase the grip performance on hard rough terrain.

Each of the first groove portions 26 has one end opened at an edge of the block which edge extends in the tire circumferential direction and the other end connected with the second groove portion 27.

It is preferable that the distance L7 in the tire circumferential direction between the paired first groove portions 26 is gradually decreased toward the axially inside of the tire in the case of the crown block especially. Thereby, a piece 28 of the block between the first groove portions 26 is easily bent toward the outside of the block during running on rough terrain, and as a result, mud in the second groove portion 27 becomes easily discharged.

The groove width w2 of the second groove portion 27 is larger than the groove width w1 of the first groove portions 26. Thus, the piece 28 between the first groove portions 26 becomes easily bent toward the second groove portion 27. As a result, the mud in the first groove portions 26 and the second groove portion 27 can be easily discharged.

Figure 3B:
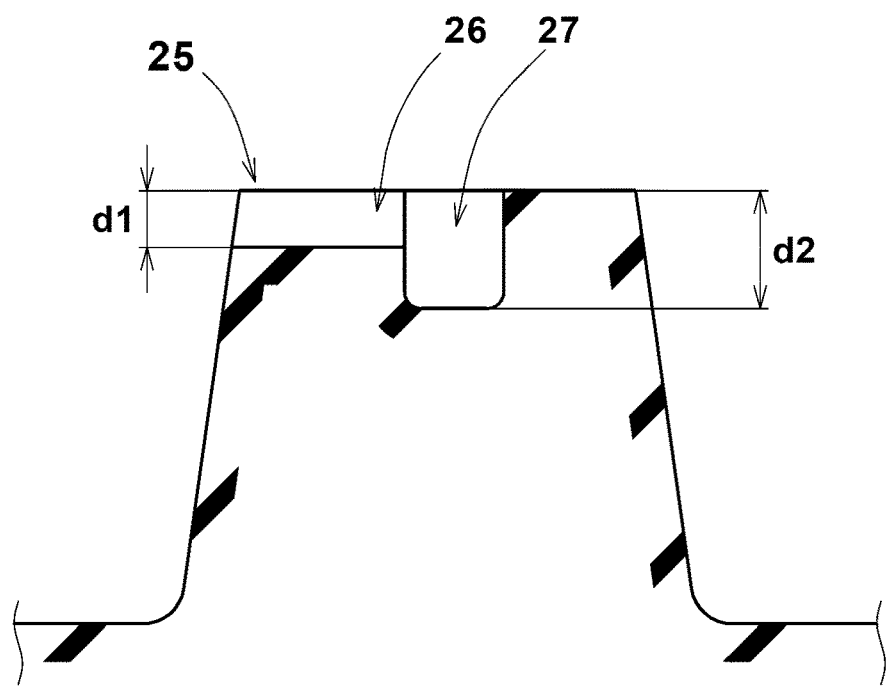
FIG. 3(b) is a cross sectional view taken along the line A-A of FIG. 3(a).

As shown in FIG. 3(b) which is a cross-sectional view taken along the line A-A in FIG. 3(a), the depth d2 of the second groove portions 27 is preferably greater than the depth d1 of the first groove portions 26 in order to further exhibit the effects described above. Preferably the depth d2 is set in a range from 1.8 to 2.0 times the depth d1.

As shown in FIG. 3(a), the maximum axial width L8 of the ground contacting top surface 24 of the grooved block 25 is preferably set in a range from 9% to 13% of the developed tread width Twe. The maximum circumferential width L9 of the ground contacting top surface 24 of the grooved block 25 is preferably set in a range from 1.20 to 1.40 times the maximum axial width L8.

Figure 4:
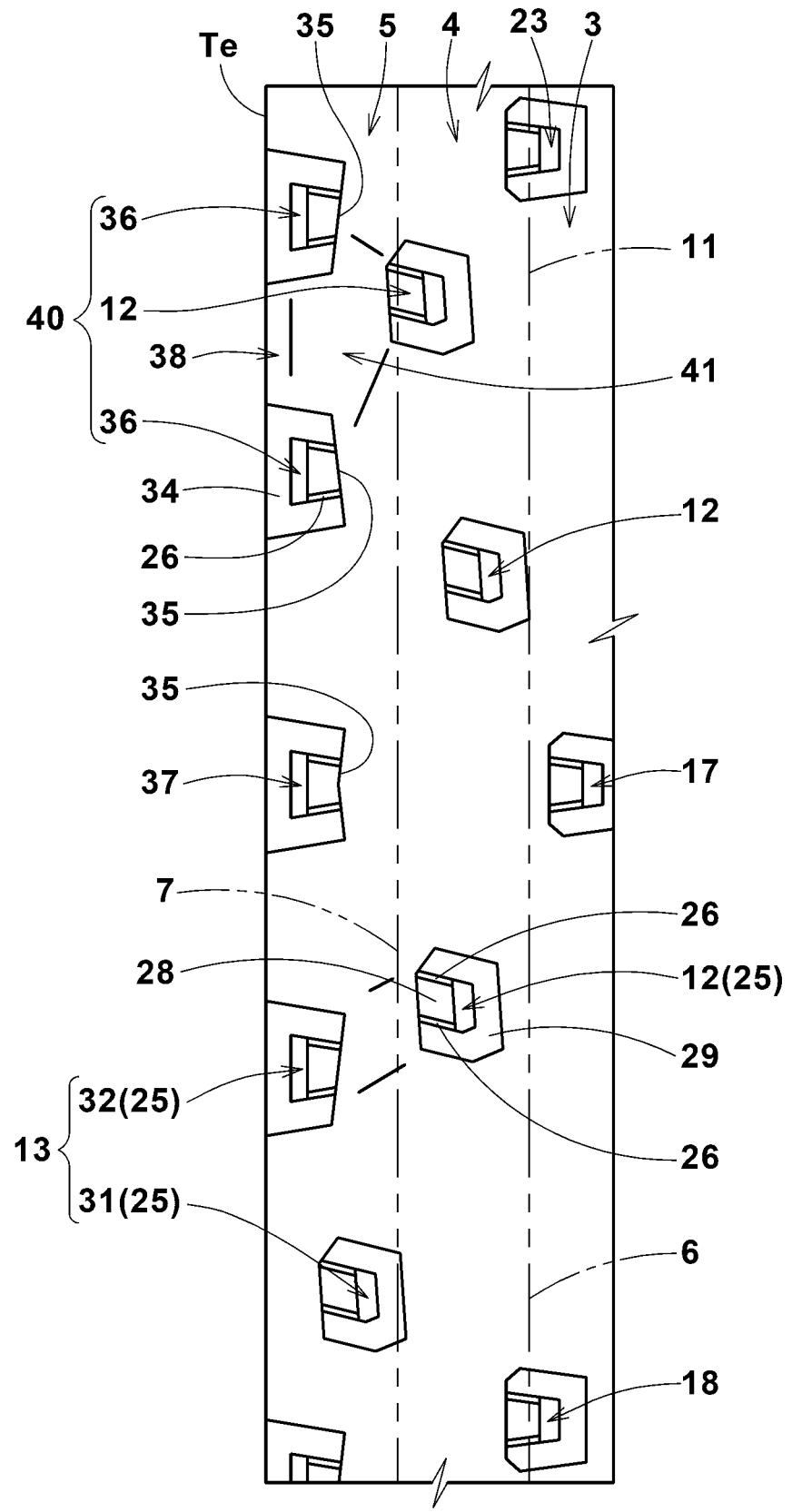
FIG. 4 is an enlarged partial view of the middle region and the shoulder region of the tread portion shown in FIG. 1.

As shown in FIG. 4 which shows the middle region 4 and the shoulder region 5 of the first embodiment, each of the middle regions 4 is provided with middle blocks 12, and each of the shoulder regions 5 is provided with shoulder blocks 13. The middle block 12 is defined as having its ground contacting top surface whose centroid is located within the middle region 4. The shoulder block 13 is defined as having its ground contacting top surface whose centroid is located within the shoulder region 5.

Each of the middle blocks 12 is the grooved block 25 whose paired first groove portions 26 are parallel with each other. Thus, a piece 28 of the block between the paired first groove portions 26 is easily deformed in the tire axial direction in relation to the block main body 29. Such middle blocks 12 can make it light feeling to lean the vehicle body when initiating turning.

The shoulder blocks 13 include axially inner shoulder block 31, and axially outermost shoulder blocks 32 to define the tread edges Te.

Each of the shoulder blocks 31 and 32 is the grooved block 25. Such shoulder blocks 13 serve to improve the traction performance during turning.

The axially inner shoulder block 31 has the same configuration as the grooved block 25 disposed in the middle region 4. Such inner shoulder blocks 31 help to make the response constant when the vehicle body is leant to near the maximum camber angle.

The paired first groove portions 26 in the ground contacting top surface 34 of the grooved block 25 provided as the axially outermost shoulder block 32, extend axially outwardly from an axially inner first edge 35 of the block which edge extends in the tire circumferential direction, and terminated within the block.

The outermost shoulder blocks 32 include two types of blocks: a first outermost shoulder block 36 and a second outermost shoulder block 37.

The first outermost shoulder block 36 has an axially inner first edge 35 extending straight in the tire circumferential direction, while inclining at a certain angle with respect to the tire circumferential direction.

The second outermost shoulder block 37 has an axially inner first edge 35 extending in the tire circumferential direction concavely toward the axially outside of the tire.

Such outermost shoulder blocks 36 and 37 may have different deformation amounts during turning, and it becomes possible to effectively discharge mud between the blocks.

In every two of the first outermost shoulder blocks 36 which are adjacent to each other in the tire circumferential direction with a space 38 therebetween (in other words, without any block therebetween), their axially inner first edges 35 are preferably inclined in opposite directions to each other. Specifically, it is preferred that the first edges 35 are inclined so that the axial width of each first outermost shoulder block 36 is gradually reduced towards the space 38. Such two first outermost shoulder blocks 36 can provide a large reaction force at the time of shearing the mud, and it is possible to exhibit excellent cornering performance.

One of the middle blocks 12 is disposed axially inward of the above-said space 38, therefore, two first outermost shoulder blocks 36 and one middle block 12 are disposed in a triangular arrangement to form a block group 40. Such block group 40 can further increase the reaction force when shearing the mud.

It is preferable that, between the blocks of the group 40 in the triangular arrangement, tie bars 41 rising from the tread base surface are provided to connect between the blocks. Such tie bars 41 help to prevent mud from accumulating in between the blocks, while increasing the stiffness of each block.

It is preferable that each of the second outermost shoulder blocks 37 is disposed axially outward of one of the second crown blocks 17. And it is preferable that, between the second outermost shoulder block 37 and the second crown block 17, the middle block 12 is not disposed. Thereby, during running on rough terrain, mud entered between the second outermost shoulder block 37 and the second crown block 17 is sheared by the first edge 35 of the second outermost shoulder block 37, and a large reaction force can be obtained.

While detailed description has been made of preferable embodiments of the present invention, the present invention can be embodied in various forms without being limited to the illustrated embodiment.

Comparison Tests

Based on the tread pattern shown in FIG. 1, pneumatic tires of size 80/100-21 (Rim size 1.60×21) for the front wheel of a motorcycle for running on rough terrain were experimentally manufactured as test tires Ex. 1-Ex. 12 and Ref. 1.

Figure 7:
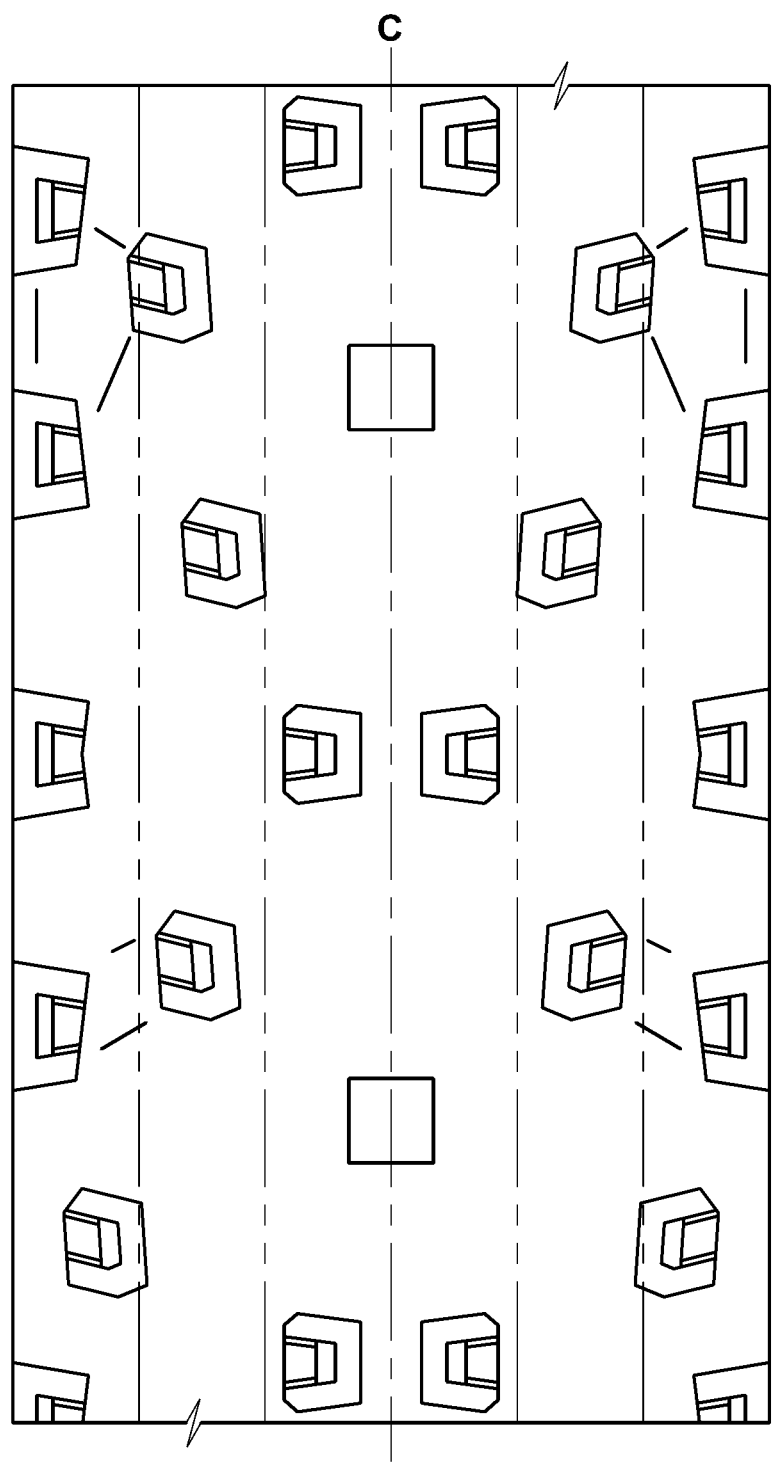
FIG. 7 is a developed partial view of a tread portion of a motorcycle tire prepared as a comparative example for comparison tests.

In the test tire Ref. 1 as a comparative example, the paired third crown blocks were replaced by the paired second crown blocks as shown in FIG. 7.

The test tires were tested for traction performance and response during turning by using a 450 cc motocross bike (tire pressure 80 kPa).

Specifications are shown in Table 1.

<Traction Performance Test> when the motocross bike was running on a relatively hard ground of compacted soil, a relatively soft ground of soil and mud, and a middle ground having middle hardness, the test rider evaluated the traction performance.

The results are indicated in Table 1 by an index based on Ref. 1 being 100, wherein the larger the value, the better the traction performance.

<Response when Turning> when the motocross bike was running in a motocross race course, the test rider evaluated the transitional response between the time of initiating turning and the time of making cornering. The results are indicated in Table 1 by an index based on Ref. 1 being 100, wherein the larger value shows that the transitional response is more stable and linear against the changes in the camber angle.

TABLE 1

| Tire | Ref. 1 | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|---|
| Tread pattern (FIG. No.) | 7 | 1 | 1 | 1 | 1 | 1 | 1 | 1 | 1 | 1 | 1 | 1 | 1 |
| Width L1/Tread width TWe (%) | 11 | 11 | 9 | 13 | 15 | 11 | 11 | 11 | 11 | 11 | 11 | 11 | 11 |
| Distance L2/Width L1 | 0.63 | 0.63 | 0.78 | 0.53 | 0.47 | 0.55 | 0.72 | 0.81 | 0.91 | 0.63 | 0.63 | 0.63 | 0.63 |
| Distance L3/Width L1 | — | 1.63 | 2.00 | 1.38 | 1.20 | 1.63 | 1.63 | 1.63 | 1.63 | 1.36 | 1.72 | 1.91 | 2.09 |
| Traction performance | | | | | | | | | | | | | |
| soft ground | 100 | 105 | 106 | 104 | 102 | 105 | 104 | 104 | 102 | 103 | 103 | 102 | 102 |
| middle ground | 100 | 104 | 104 | 104 | 103 | 103 | 104 | 104 | 102 | 102 | 104 | 104 | 103 |
| hard ground | 100 | 100 | 99 | 102 | 100 | 99 | 102 | 103 | 100 | 99 | 102 | 103 | 102 |
| Response | 100 | 106 | 106 | 105 | 104 | 103 | 103 | 106 | 103 | 103 | 106 | 106 | 103 |

From the test results, it was confirmed that the tires according to the present invention exerted excellent traction performance in various ground conditions.

DESCRIPTION OF THE REFERENCE SIGNS 2 tread portion
3 crown region
11 crown block
16 first crown block
C tire equator
17 second crown block
18 third crown block

The invention claimed is:

1. A motorcycle tire for running on rough terrain comprising:
a tread portion provided with crown blocks each defined as having a ground contacting top surface whose centroid is positioned in a crown region which is defined as being centered on the tire equator and having a developed axial width of ⅓ of the developed tread width of the tread portion, wherein
the crown blocks are arranged symmetrically about the tire equator and independently from each other and the crown blocks consist of:
first crown blocks disposed on the tire equator,
plural pairs of second crown blocks disposed one on each side of the tire equator symmetrically about the tire equator at different circumferential positions from circumferential positions of the first crown blocks, and
plural pairs of third crown blocks disposed one on each side of the tire equator symmetrically about the tire equator at different circumferential positions from the circumferential positions of the first crown blocks and the second crown blocks,
wherein
the first crown blocks have a maximum axial width L1,
in each pair of the second crown blocks, the minimum axial distance L2 between the respective edges of the ground contacting top surfaces thereof is smaller than the maximum axial width L1 of the first blocks, and
in each pair of the third crown blocks, the minimum axial distance L3 between the respective edges of the ground contacting top surfaces thereof is larger than the maximum axial width L1 of the first crown blocks,
wherein
the first crown blocks, the paired second crown blocks and the paired third crown blocks are arranged around the circumference of the tire without overlapping with each other in the tire circumferential direction, and
a minimum circumferential distance L4 from the edge of the ground contacting top surface of each of the first crown block to the respective edges of the ground contacting top surfaces of the circumferentially adjacent one of the plural pairs of the second crown blocks is larger than
a minimum circumferential distance L5 from the edge of said ground contacting top surface of said each first crown block to the respective edges of the ground contacting top surfaces of the circumferentially adjacent one of the plural pairs of the third crown blocks,
wherein
the maximum axial width L1 is in a range from 9% to 13% of the developed tread width,
the minimum axial distance L2 is in a range from 0.60 to 0.80 times the maximum axial width L1, and
the minimum axial distance L3 is in a range from 1.50 to 1.70 times the maximum axial width L1,
wherein
a pair of shoulder regions defined as extending from respective tread edges toward the tire equator and each having a developed width of ⅙ of the developed tread width, are provided with shoulder blocks, wherein each shoulder block is defined as having a ground contacting top surface whose centroid is located within the shoulder region, and
a pair of middle regions defined as extending between the respective shoulder regions and the crown region and each having a developed width of ⅙ of the developed tread width, are each provided with middle blocks,
wherein each middle block is defined as having a ground contacting top surface whose centroid is located within the middle region, and
wherein
each of the middle blocks is a grooved block whose ground contacting top surface is provided with a U-shaped groove composed of a pair of first groove portions extending in a tire axial direction, and a second groove portion connecting therebetween.

2. The motorcycle tire for running on rough terrain according to claim 1, wherein
the first crown blocks, the plural pairs of the second crown blocks and the plural pairs of the third crown blocks are arranged circumferentially of the tire such that
each of the first crown blocks is disposed between one of the plural pairs of the second crown blocks and one of the plural pairs of the third crown blocks.

3. The motorcycle tire for running on rough terrain according to claim 1, wherein
the first crown blocks, the plural pairs of the second crown blocks and the plural pairs of the third crown blocks are arranged circumferentially of the tire such that
each of the plural pairs of the second crown blocks is disposed between one of the first crown blocks and one of the plural pairs of the third crown blocks.

4. The motorcycle tire for running on rough terrain according to claim 1, wherein
the first crown blocks, the plural pairs of the second crown blocks and the plural pairs of the third crown blocks are arranged circumferentially of the tire such that
each of the plural pairs of the third crown blocks is disposed between one of the plural pairs of the second crown blocks and one of the first crown blocks.

5. A motorcycle tire for running on rough terrain comprising:
a tread portion provided with crown blocks each defined as having a ground contacting top surface whose centroid is positioned in a crown region which is defined as being centered on the tire equator and having a developed axial width of ⅓ of the developed tread width of the tread portion,
wherein
the crown blocks are arranged symmetrically about the tire equator and independently from each other and the crown blocks consist of:
first crown blocks disposed on the tire equator,
plural pairs of second crown blocks disposed one on each side of the tire equator symmetrically about the tire equator at different circumferential positions from circumferential positions of the first crown blocks, and
plural pairs of third crown blocks disposed one on each side of the tire equator symmetrically about the tire equator at different circumferential positions from the circumferential positions of the first crown blocks and the second crown blocks,
wherein
the first crown blocks have a maximum axial width L1,
in each pair of the second crown blocks, the minimum axial distance L2 between the respective edges of the ground contacting top surfaces thereof is smaller than the maximum axial width L1 of the first crown blocks, and in each pair of the third crown blocks, the minimum axial distance L3 between the respective edges of the ground contacting top surfaces thereof is larger than the maximum axial width L1 of the first crown blocks, wherein the first crown blocks, the paired second crown blocks and the paired third crown blocks are arranged around the circumference of the tire without overlapping with each other in the tire circumferential direction, and a minimum circumferential distance L4 from the edge of the ground contacting top surface of each of the first crown block to the respective edges of the ground contacting top surfaces of the circumferentially adjacent one of the plural pairs of the second crown blocks is larger than a minimum circumferential distance L5 from the edge of said ground contacting top surface of said each first crown block to the respective edges of the ground contacting top surfaces of the circumferentially adjacent one of the plural pairs of the third crown blocks, and wherein the first crown blocks, the plural pairs of the second crown blocks and the plural pairs of the third crown blocks are arranged circumferentially of the tire such that each of the plural pairs of the second crown blocks is disposed between one of the first crown blocks and one of the plural pairs of the third crown blocks wherein a pair of shoulder regions defined as extending from respective tread edges toward the tire equator and each having a developed width of ⅙ of the developed tread width, are provided with shoulder blocks, wherein each shoulder block is defined as having a ground contacting top surface whose centroid is located within the shoulder region, and a pair of middle regions defined as extending between the respective shoulder regions and the crown region and each having a developed width of ⅙ of the developed tread width, are each provided with middle blocks, wherein each middle block is defined as having a ground contacting top surface whose centroid is located within the middle region, and wherein each of the middle blocks is a grooved block whose ground contacting top surface is provided with a U-shaped groove composed of a pair of first groove portions extending in a tire axial direction, and a second groove portion connecting therebetween.

6. A motorcycle tire for running on rough terrain comprising:

a tread portion provided with crown blocks each defined as having a ground contacting top surface whose centroid is positioned in a crown region which is defined as being centered on the tire equator and having a developed axial width of ⅓ of the developed tread width of the tread portion, wherein the crown blocks are arranged symmetrically about the tire equator and independently from each other and the crown blocks consist of:

first crown blocks disposed on the tire equator, plural pairs of second crown blocks disposed one on each side of the tire equator symmetrically about the tire at different circumferential positions from circumferential positions of the first crown blocks, and plural pairs of third crown blocks disposed one on each side of the tire equator symmetrically about the tire at different circumferential positions from the circumferential positions of the first crown blocks and the second crown blocks, wherein the first crown blocks have a maximum axial width L1, in each pair of the second crown blocks, the minimum axial distance L2 between the respective edges of the ground contacting top surfaces thereof is smaller than the maximum axial width L1 of the first crown blocks, and in each pair of the third crown blocks, the minimum axial distance L3 between the respective edges of the ground contacting top surfaces thereof is larger than the maximum axial width L1 of the first crown blocks, wherein the first crown blocks, the paired second crown blocks and the paired third crown blocks are arranged around the circumference of the tire without overlapping with each other in the tire circumferential direction, and a minimum circumferential distance L4 from the edge of the ground contacting top surface of each of the first crown block to the respective edges of the ground contacting top surfaces of the circumferentially adjacent one of the plural pairs of the second crown blocks is larger than a minimum circumferential distance L5 from the edge of said ground contacting top surface of said each first crown block to the respective edges of the ground contacting top surfaces of the circumferentially adjacent one of the plural pairs of the third crown blocks, and wherein the first crown blocks, the plural pairs of the second crown blocks and the plural pairs of the third crown blocks are arranged circumferentially of the tire such that each of the plural pairs of the third crown blocks is disposed between one of the plural pairs of the second crown blocks and one of the first crown blocks wherein a pair of shoulder regions defined as extending from respective tread edges toward the tire equator and each having a developed width of ⅙ of the developed tread width, are provided with shoulder blocks, wherein each shoulder block is defined as having a ground contacting top surface whose centroid is located within the shoulder region, and a pair of middle regions defined as extending between the respective shoulder regions and the crown region and each having a developed width of ⅙ of the developed tread width, are each provided with middle blocks, wherein each middle block is defined as having a ground contacting top surface whose centroid is located within the middle region, and wherein each of the middle blocks is a grooved block whose ground contacting top surface is provided with a U-shaped groove composed of a pair of first groove portions extending in a tire axial direction, and a second groove portion connecting therebetween.

7. The motorcycle tire according to claim 3, wherein each of the second crown blocks is a grooved block whose ground contacting top surface is provided with a U-shaped groove composed of a pair of first groove portions extending in a tire axial direction, and a second groove portion connecting therebetween, each of the third crown blocks is a grooved block whose ground contacting top surface is provided with a U-shaped groove composed of a pair of first groove portions extending in a tire axial direction, and a second groove portion connecting therebetween, and each of the first crown blocks is provided with no groove in the ground contacting top surface.

8. The motorcycle tire according to claim 4, wherein each of the second crown blocks is a grooved block whose ground contacting top surface is provided with a U-shaped groove composed of a pair of first groove portions extending in a tire axial direction, and a second groove portion connecting therebetween, each of the third crown blocks is a grooved block whose ground contacting top surface is provided with a U-shaped groove composed of a pair of first groove portions extending in a tire axial direction, and a second groove portion connecting therebetween, and each of the first crown blocks is provided with no groove in the ground contacting top surface.

9. The motorcycle tire according to claim 7, wherein in each of the second crown blocks and the third crown blocks, each of the first groove portions has one end opened at an axially outer edge of the block which edge extends in a tire circumferential direction, and the other end connected with one of the second groove portions, and in each of the middle blocks, each of the first groove portions has one end opened at an axially outer edge of the middle block which edge extends in a tire circumferential direction and the other end connected with one of the second groove portions.

10. The motorcycle tire according to claim 8, wherein in each of the second crown blocks and the third crown blocks, each of the first groove portions has one end opened at an axially outer edge of the block which edge extends in a tire circumferential direction, and the other end connected with one of the second groove portions, and in each of the middle blocks, each of the first groove portions has one end opened at an axially outer edge of the middle block which edge extends in a tire circumferential direction and the other end connected with one of the second groove portions.

11. The motorcycle tire according to claim 9, wherein in each of the second and third crown blocks, the distance in the tire circumferential direction between the first groove portions is gradually decreased toward the axially inside of the tire.

12. The motorcycle tire according to claim 10, wherein in each of the second and third crown blocks, the distance in the tire circumferential direction between the first groove portions is gradually decreased toward the axially inside of the tire.

13. The motorcycle tire according to claim 11, wherein in each of the middle blocks, the first groove portions are substantially parallel with each other.

14. The motorcycle tire according to claim 12, wherein in each of the middle blocks, the first groove portions are substantially parallel with each other.

15. The motorcycle tire according to claim 13, wherein each of the shoulder blocks is a grooved block whose ground contacting top surface is provided with a U-shaped groove composed of a pair of first groove portions extending in a tire axial direction, and a second groove portion connecting therebetween, the shoulder blocks include axially outermost shoulder blocks arranged along the tread edges, and in each of the axially outermost shoulder blocks, each of the first groove portions has one end opened at an axially inner edge of the block which edge extends in a tire circumferential direction and the other end connected with one of the second groove portions.

16. The motorcycle tire according to claim 14, wherein each of the shoulder blocks is a grooved block whose ground contacting top surface is provided with a U-shaped groove composed of a pair of first groove portions extending in a tire axial direction, and a second groove portion connecting therebetween, the shoulder blocks include axially outermost shoulder blocks arranged along the tread edges, and in each of the axially outermost shoulder blocks, each of the first groove portions has one end opened at an axially inner edge of the block which edge extends in a tire circumferential direction and the other end connected with one of the second groove portions.

17. The motorcycle tire according to claim 15, wherein in each of the axially outermost shoulder blocks, the distance in the tire circumferential direction between the first groove portions is gradually decreased toward the axially inside of the tire.

18. The motorcycle tire according to claim 16, wherein in each of the axially outermost shoulder blocks, the distance in the tire circumferential direction between the first groove portions is gradually decreased toward the axially inside of the tire.

19. The motorcycle tire according to claim 17, wherein the ground contacting top surface of each of the first crown blocks is a rectangle.

20. The motorcycle tire according to claim 18, wherein the ground contacting top surface of each of the first crown blocks is a rectangle.

* * * * *